3,299,052
WATER-DISPERSIBLE FORM OF DIALDEHYDE STARCH AND PROCESS THEREFOR

James Huey Curtis, Elkhart, Ind., assignor to Miles Laboratories, Inc., Elkhart, Ind., a corporation of Indiana
No Drawing. Filed Dec. 12, 1963, Ser. No. 329,987
8 Claims. (Cl. 260—233.3)

This invention relates to a form of dialdehyde polysaccharides which is soluble in water at room temperature and to a process of preparing such material. More particularly, this invention relates to a spray dried composition of the reaction product between a dialdehyde polysaccharide and a hypochlorite oxidized polysaccharide.

Dialdehyde polysaccharides are well known in the art. Such materials are frequently referred to as periodate oxidized polysaccharides because of their preparation by the well known oxidation of polysaccharides with periodic acid. This preparation can be illustrated by the conversion of a polysaccharide, such as starch, to dialdehyde starch or periodate oxidized starch using perodic acid in accordance with the following equation:

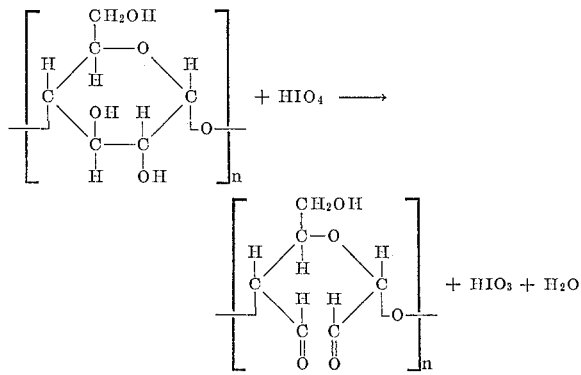

wherein $n$ stands for the number of repeating structural units in the molecule, which may range from as few as about 20 to as many as several thousand. The preparation of dialdehyde starch is more particularly described in U.S. patents, No. 2,648,629 of W. Dvonch et al. and No. 2,713,553 of C. L. Mehltretter. It is also known that these dialdehyde polysaccharides are quite insoluble in water, especially cold or room temperature water. Various techniques have been employed to disperse the dialdehyde polysaccharides and thus increase the water solubility. These materials are generally employed in aqueous applications and thus must be appreciably dissolved or intimately dispersed in aqueous media.

It is an object of the present invention to provide a form of dialdehyde polysaccharides which is readily soluble in water at room temperature.

The novel compounds of the present invention comprise the finely-divided solidified reaction products of from about 15 to about 30 parts by weight hypochlorite oxidized polysaccharides and from about 70 to about 85 parts by weight dialdehyde polysaccharides wherein from about 0.5 to about 100 units out of 100 of the original anhydroglucose units of the original polysaccharides have been oxidized to dialdehyde units represented by the formula:

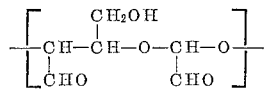

Preferably the compounds of the present invention are formed from dialdehyde polysaccharides which are from about 90 to about 100 percent oxidized. The preferred compounds contain about 70 parts by weight dialdehyde polysaccharides and about 30 parts by weight hypochlorite oxidized polysaccharides. In addition, the preferred finely-divided solidified products are spray dried.

The dialdehyde polysaccharides to be used as starting materials to prepare the novel compounds of the present invention may be the dialdehyde derivatives of any polysaccharide, such as corn, wheat, rice, tapioca or potato starches, amyloses, amylopectins, celluloses, gums, dextrans, algins, inulins and the like. Of these polysaccharides, the dialdehyde derivatives of starch known generically as dialdehyde starch are the best known and most widely used. However, where it is desired to have dialdehydes of other polysaccharides, these may be used as well. The dialdehyde polysaccharides useful in the present invention can be from about 0.5 to about 100 percent oxidized. In general, it is preferred to use dialdehyde polysaccharides which are from 90 percent to 100 percent oxidized; i.e., those wherein about 90 to 100 of each 100 of the original anhydroglucose units have been converted to dialdehyde units such as by periodate oxidation as above described.

The hypochlorite oxidized polysaccharides, such as hypochlorite oxidized starches, to be used as starting materials to prepare the novel compounds of the present invention are well known in the art and are prepared by well known procedures, such as treatment of starches with alkaline hypochlorite salts.

The novel compounds of the present invention are prepared by mixing about 70 to about 85 parts by weight, preferably 70 parts by weight, dialdehyde polysaccharides with from about 15 to about 30 parts by weight, preferably about 30 parts by weight, hypochlorite oxidized polysaccharides in water to form a slurry containing about 10–15 weight percent solids, heating the slurry to about 90°–100° C., preferably about 95°–97° C., for about 5 to about 15 minutes with stirring until the dispersion of the solid material is complete, cooling the dispersion to about 70° C., adjusting the pH of the dispersion to about 4–5.5; preferably about 4.3–4.5, and then drying the dispersion, preferably by spray drying, and collecting the finely-divided dried solidified product. If the dispersion obtained by the above process is not adjusted to the proper pH value before spray drying, the resulting finely-divided solid product is not easily redispersible in water at room temperautre. The pH is adjusted by well known techniques, such as adding minor amounts of sodium hydroxide, sodium carbonate, borax, dibasic sodium phosphate and the like. Typical spray drying techniques and apparatus are employed in spray drying the above prepared dispersion.

The product obtained by the above described process is a substantially free-flowing powder which is easily dispersed by simple mixing in water at room temperature. The alkalinity of the water employed to prepare these dispersions and to redisperse the powder product is not critical in the present invention whereas the prior art dispersion processes for dialdehyde polysaccharides were quite sensitive as to alkalinity of the water.

When the product of the present invention is redispersed in water and is to be used to treat paper or paper pulp so as to improve the dry and wet tensile strengths of the resulting treated paper, it is generally necessary to also employ a cationizing agent to aid in coupling the dispersed reaction product to the paper or paper pulp. These cationizing agents are the well known cationic starches, polymeric amines and polyamides. The cationizing agent can be added first to paper or a slurry of paper pulp, followed by addition of the reaction product dispersion. Alternatively, the cationizing agent and the reaction product dispersion can be mixed together and this mixture applied to the paper or paper pulp. Illustrative examples of useful cationizing agents are condensation products of dicyandiamide and formaldehyde, water-soluble polyamide resins crosslinked with epichlorohydrin, and water-soluble compounds of zirconium, such as zirconium oxychloride.

The process of the present invention is also distinct improvement over the prior art since higher solids content can be employed in the dialdehyde polysaccharide slurry without gel formation. The time at dispersion temperature of about 5–15 minutes is substantially less than the 40 minutes generally used by the prior art to disperse the dialdehyde polysaccharides alone. This feature enables the dispersion process, which was a batch technique in the prior art, to become a substantially continuous process, if desired. The present process has an additional advantage. When the reaction mixture slurry is heated to dispersion temperature, the dialdehyde polysaccharides and the hypochlorite oxidized polysaccharides pass directly from the solid phase to a liquid dispersed phase without passing through a swelling phase. The lack of swelling, which is always present with prior art dialdehyde polysaccharide materials, enables equipment of smaller volume to be used for dispersion.

The invention is further described in the following examples.

*Example I*

Seventy (70) grams of a dialdehyde corn starch (containing 9–10 weight percent moisture and about 90–98 percent oxidized) plus 30 grams of hypochlorite oxidized corn starch (Douglas Clearsol Gum, Grade W, sold by Penick and Ford, Ltd.) were mixed together and added to 900 ml. of tap water at 95° C. This mixture required 5 minutes to disperse. This dispersion was then cooled to 70° C., pH adjusted to 4.3 and then passed into a spray drier having an inlet temperature of about 177° C. and 77° C. outlet temperature. The spray dried product was collected in plastic bags.

The utility of the above product is shown in the following example.

*Example II*

A 50 g. portion of the product obtained in Example I was added to 950 ml. of tap water at 26°–28° C. and stirred for about 10 minutes at which time the finely-divided material was thoroughly dispersed or dissolved. To this dispersion were added 10 g. of zirconium oxychloride as a cationizing agent. A portion of this cationized dispersion was added to a bleached cellulosic kraft pulp having 450 cc. Canadian Standard Freeness and which had been diluted to a consistency of 1.0 weight percent based on oven dry pulp. The cationized dispersion was added in an amount of 1.0 weight percent solids based on oven dry pulp. Handsheets having basis weight of 40 lbs. for 500 sheets 24 x 36 in. were prepared from this pulp on standard equipment, such as a Noble and Wood handsheet machine. These handsheets were conditioned at 21°–23° C. for 24 hours at 50±3 percent relative humidity. Test strips cut from the handsheets were then soaked in water at room temperature for various periods of time and then tested for wet tensile strength. The test procedure is described in TAPPI standard T 456 m–49. Some of the handsheets were stored and aged for several days at 21°–23° C. (72±2° F.) and 50±3 percent relative humidity before testing for wet tensile strength. The test results are tabulated below. Handsheets of same basis weight which were not treated with the novel reaction product had wet tensile strength of only 1.80 lbs./in. width.

TABLE I

| Soaking Time, min. | Aging, days | Wet Tensile Strength, lbs./in. of width |
|---|---|---|
| 0 | 0 | 8.8 |
| 5 | 0 | 7.74 |
| 30 | 0 | 6.50 |
| 60 | 0 | 5.30 |
| 180 | 0 | 4.7 |
| 5 | 3 | 9.1 |
| 5 | 7 | 10.6 |

It can be seen from the above data that the use of the novel reaction product of the present invention provides improved wet tensile strength for paper. It is also seen that aging of the treated paper for several days provides additional improvement in wet tensile strength. Similar increases in wet tensile values can be obtained by aging at 105° C. for 10 minutes, for example.

*Example III*

Handsheets having a basis weight of 40 lbs. for 500 sheets 24 x 36 in. were prepared from bleached kraft pulp beaten to 540 cc. Canadian Standard Freeness which had been mixed with dispersions of 1.0 weight percent dialdehyde starch, 0.7 weight percent dialdehyde starch and the reaction product containing 0.7 weight percent dialdehyde starch and 0.3 weight percent hypochlorite oxidized starch, respectively. Test strips cut from the handsheets were soaked in distilled water at room temperature for 5 minutes and then the wet tensile strengths were measured. The results are shown in the following table.

TABLE II

| Starch Dispersion, weight percent | | Wet Tensile Strength, lbs./in. of width |
|---|---|---|
| Dialdehyde Starch | Hypochlorite Oxidized Starch | |
| 1.0 | --- | 7.8 |
| 0.7 | --- | 6.2 |
| 0.7 | 0.3 | 8.4 |

It can be seen from the above data that the reaction product of hypochlorite oxidized starch and dialdehyde starch is useful in increasing the wet tensile strength of so-treated paper.

*Example IV*

Handsheets having a basis weight of 40 lbs. for 500 sheets 24 x 36 in. were prepared from bleached cellulosic kraft pulp beaten to Canadian Standard Freeness of about 450 cc. Handsheets were also prepared from this pulp which had been mixed with 1.0 weight percent, based on oven dry pulp, of the dialdehyde starch-hypochlorite oxidized starch reaction product of Example I. Portions of both pulps were aged at room temperature for seven days and handsheets were then prepared from the aged pulps. Dry tensile strengths were measured on test strips cut from these handsheets according to TAPPI standard T 404 os–61. The results are tabulated below.

TABLE III

| Dispersion, weight percent | | Aging, days | Dry Tensile Strength, lbs./in. of width |
|---|---|---|---|
| Dialdehyde Starch | Oxidized Starch | | |
| 0.7 | 0 | 0 | 23.4 |
| 0.7 | 0.3 | 0 | 26.8 |
| 0 | 0 | 7 | 23.6 |
| 0.7 | 0.3 | 7 | 28.2 |

What is claimed is:

1. A composition dispersible in water at room temperature consisting essentially of the finely-divided solidified reaction product of from about 15 to about 30 parts by weight hypochlorite oxidized starch and from about 70 to about 85 parts by weight dialdehyde starch wherein from about 90 to about 100 units out of 100 of the original anhydroglucose units of the original starch have been oxidized to dialdehyde units represented by the formula:

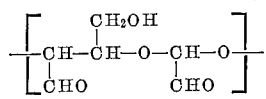

2. A composition dispersible in water at room temperature consisting essentially of the finely-divided spray dried reaction product of about 30 parts by weight hypochlorite oxidized starch and about 70 parts by weight dialdehyde starch wherein from about 90 to about 100 units out of 100 of the original anhydroglucose units of the original starch have been oxidized to dialdehyde units represented by the formula:

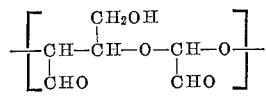

3. A process for preparing a composition dispersible in water at room temperature which comprises mixing in water a mixture consisting essentially of from about 70 to about 85 parts by weight dialdehyde starch and from about 15 to about 30 parts by weight hypochlorite oxidized starch to form a slurry containing about 10–15 weight percent solids, reacting the non-aqueous constituents of the slurry with each other by heating the slurry to about 90°–100° C. for about 5–15 minutes with stirring until the dispersion of the solid material is complete, cooling the dispersion to about 70° C., adjusting the pH of the dispersion to about 4–5.5 and then drying the dispersion and collecting the finely-divided dried solidified product.

4. A process as claimed in claim 3 wherein the pH of the dispersion is adjusted to 4.3–4.5 before drying.

5. A process as claimed in claim 3 wherein the dispersion is dried by spray drying.

6. A process as claimed in claim 3 wherein about 70 parts by weight dialdehyde starch are mixed with about 30 parts by weight hypochlorite oxidized starch.

7. A process as claimed in claim 3 wherein the dispersion temperature is about 95°–97° C.

8. A process for preparing a composition dispersible in water at room temperature which comprises mixing in water a mixture consisting essentially of about 70 parts by weight dialdehyde starch and about 30 parts by weight hypochlorite oxidized starch to form a slurry containing about 10–15 weight percent solids, reacting the non-aqueous constituents of the slurry with each other by heating the slurry to about 95°–97° C. for about 5–15 minutes with stirring until the dispersion of the solid material is complete, cooling the dispersion to about 70° C., adjusting the pH of the dispersion to about 4.3–4.5 and then spray drying the dispersion and collecting the finely-divided dried solidified product.

References Cited by the Examiner
UNITED STATES PATENTS
2,989,521   6/1921   Senti et al. _____ 260—233.3

OTHER REFERENCES

Mellies et al: Indust. and Eng. Chem., vol. 50, No. 9 (1958), p. 1311—260-Dialdehyde Starch Digest.

Radley, J. A.: Manuf. Chem. and Manuf. Perfumed, vol. XIII (1942), p. 158—260-233.3.

LEON J. BERCOVITZ, *Primary Examiner.*

R. W. MULCAHY, *Assistant Examiner.*